J. ALLEN.
Harrow.
No. 30,905.
Patented Dec. 18, 1860.
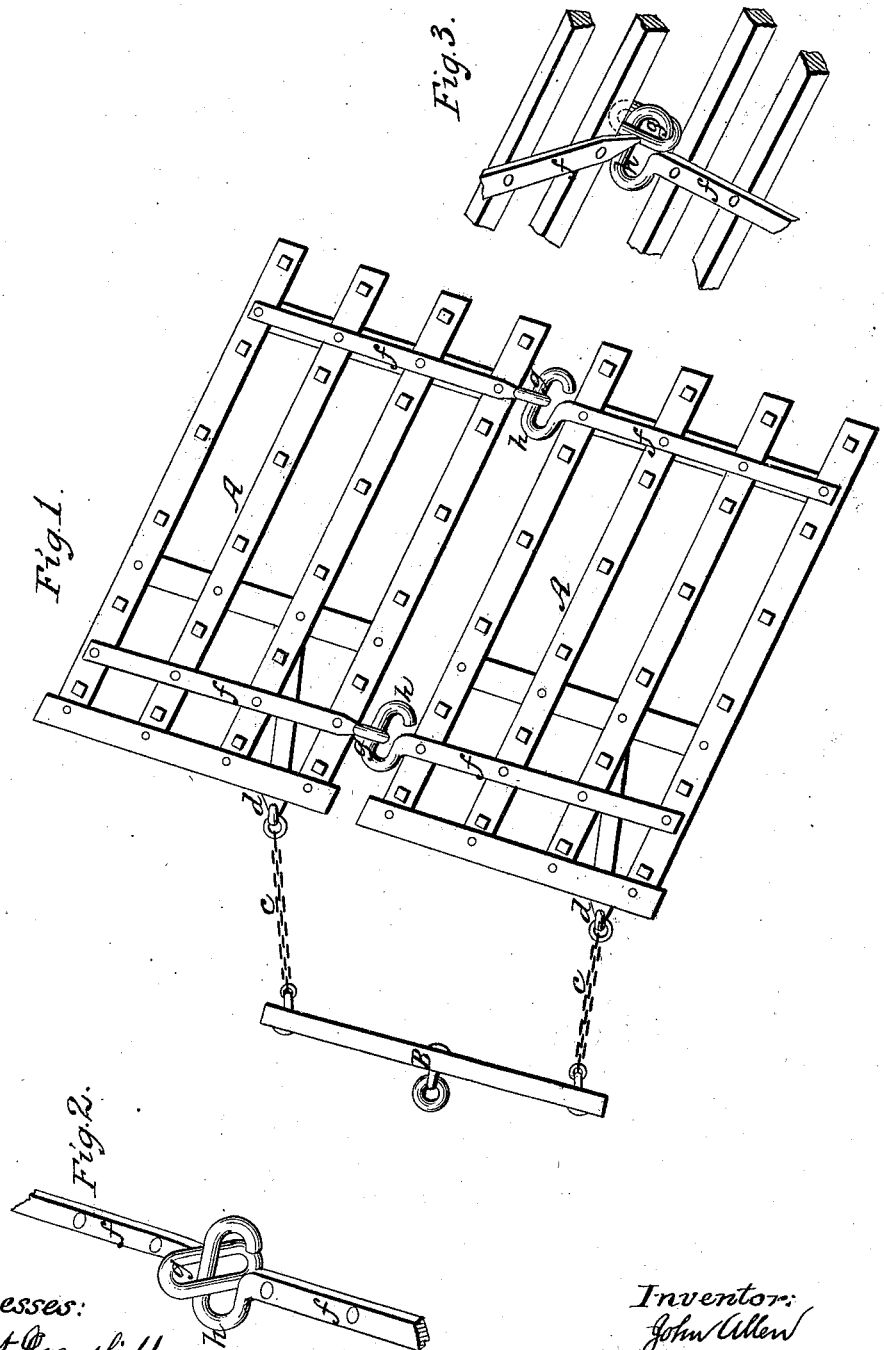

UNITED STATES PATENT OFFICE.

JOHN ALLEN, OF UNION, NEW YORK.

IMPROVEMENT IN HARROWS.

Specification forming part of Letters Patent No. 30,905, dated December 18, 1860.

*To all whom it may concern:*

Be it known that I, JOHN ALLEN, of Union, in the county of Monroe and State of New York, have invented a new and useful Improvement in Harrows; and I do hereby declare that the following is a full and exact description thereof, reference being had to the accompanying drawings, making part of this specification, in which—

Figure 1 is a general plan view. Fig. 2 is a view in perspective of the coupling device detached. Fig. 3 is a detached view of the coupling in the position in which the two parts may be disconnected.

Similar letters designate corresponding parts in all of the figures.

My invention consists in an improved device for connecting two or more of the sections composing the harrow together in a manner to secure perfect flexibility, with free vertical, longitudinal, and lateral motion, and the ready separation of the parts.

As represented in the drawings, A A are two sections provided with suitable teeth to constitute a harrow when properly united together.

B is a draft-bar, to which the team is attached. It is connected with the two sections by chains C C, which are attached to hooks $d$ $d$, one of which is firmly secured to each part of the harrow. Two strong iron bars or straps, $f f$, are securely bolted across each of the sections, those upon one being provided with vertical links $g\ g$ at one end, which lie outside of the frame of the section. The bars on the other section terminate in hooks or oblong hook-links $h\ h$ of size and form corresponding to the links, but placed horizontally, as shown in Fig. 2. By turning the part with the links $g\ g$ up to a position at right angles with the other section, the links may be connected with the hooks or hook-links by inserting them in the space at the point of the latter, and when both parts are returned to their working position disconnection cannot occur, although the greatest freedom of motion is obtained. The sections may rise and fall together to follow the undulations of the ground; or one may move up or down vertically to the extent admitted by the length of the links independently of the other. A corresponding liberty of longitudinal motion is secured by the position of the hooks or hook-links $h\ h$. The attendant may at any time and place detach the parts of the harrow by simply turning one-half to a vertical position, either for convenience of removing, repairing, or for using one section alone for cultivating between the rows of crops. The connecting parts are easily made by any ordinary smith, and from their simplicity and the strength of material are durable, serviceable, and cheap.

I do not claim securing a horizontal and vertical motion in the connection of the parts; nor do I claim a method of connecting the sections by hooks and eyes so arranged as to require a particular position of the respective sections to connect and disconnect them; but

What I claim as my invention, and desire to secure by Letters Patent, is—

The combination and arrangement of the vertical oblong links $g\ g$ and horizontal oblong hook-links $h\ h$, substantially as described, whereby the double advantage of allowing a free vertical and horizontal play to the sections of the harrow and a very efficient and convenient means of connecting and disconnecting them readily is secured at the same time.

JOHN ALLEN.

Witnesses:
S. J. ALLIS,
J. FRASER.